(12) United States Patent
Mazar et al.

(10) Patent No.: US 8,469,390 B2
(45) Date of Patent: Jun. 25, 2013

(54) BABY SAFETY CAR SEAT CONVERTIBLE INTO A ROLLABLE BABY SEAT

(75) Inventors: Shabtai Yoav Mazar, Herzelia (IL); Maxim Holtzman, Jerusalem (IL)

(73) Assignee: Doona Holdings Ltd, Quarry Bay (HK)

( * ) Notice: Subject to any disclaimer, the term of this patent is extended or adjusted under 35 U.S.C. 154(b) by 0 days.

(21) Appl. No.: 13/542,266

(22) Filed: Jul. 5, 2012

(65) Prior Publication Data

US 2012/0267877 A1    Oct. 25, 2012

Related U.S. Application Data

(63) Continuation of application No. 13/263,884, filed as application No. PCT/IL2010/000307 on Apr. 18, 2010.

(60) Provisional application No. 61/212,773, filed on Apr. 16, 2009.

(51) Int. Cl.
*B62B 1/00* (2006.01)
*B62B 7/00* (2006.01)
*B60N 2/28* (2006.01)

(52) U.S. Cl.
USPC ... 280/648; 280/643; 280/47.315; 280/47.38; 280/30

(58) Field of Classification Search
USPC ............... 280/643, 648, 47.315, 655, 47.371, 280/30, 642, 647, 650, 657, 658, 43.14, 47.38, 280/47.39; 297/130, 131, 118, 256.16
See application file for complete search history.

(56) References Cited

U.S. PATENT DOCUMENTS

| 1,693,633 | A |   | 12/1928 | Allen |
| 4,763,911 | A | * | 8/1988  | Gebhard et al. ................. 280/37 |
| 4,786,064 | A | * | 11/1988 | Baghdasarian ................. 280/30 |

(Continued)

FOREIGN PATENT DOCUMENTS

| DE | 20007466 | 7/2000 |
| DE | 10008230 | 9/2001 |

(Continued)

OTHER PUBLICATIONS

International Search Report and Written Opinion from International Application No. PCT/IL2010/000307 dated May 26, 2011.

(Continued)

*Primary Examiner* — J. Allen Shriver, II
*Assistant Examiner* — James M Dolak
(74) *Attorney, Agent, or Firm* — Workman Nydegger

(57) ABSTRACT

A baby safety car seat convertible into a rollable baby seat, and comprising a front, head area and a rear, feet area, the head area being higher than the feet area; a right and left pair of front and rear legs, and a handle. The legs of each pair have distal ends associated with wheels and proximal ends articulated to the seat at corresponding leg attachment area. Both legs are rotatable relative to each other and to the seat between a storage position to be taken in a safety car seat mode of the seat, and an operational position to be taken in a rolling-carrier mode of the seat. The legs can have an intermediate position between the storage and operational position, and can be rotatable between the intermediate and operational positions, at least partially under the influence of gravity force.

16 Claims, 13 Drawing Sheets

U.S. PATENT DOCUMENTS

| | | | |
|---|---|---|---|
| 4,832,354 A | | 5/1989 | LaFreniere |
| 4,834,403 A | | 5/1989 | Yanus et al. |
| 4,874,182 A | | 10/1989 | Clark |
| D310,054 S | * | 8/1990 | Tucker et al. ............... D12/129 |
| 4,989,888 A | | 2/1991 | Qureshi et al. |
| 5,133,567 A | | 7/1992 | Owens |
| 5,318,311 A | | 6/1994 | Bofill |
| 5,398,951 A | | 3/1995 | Ryu |
| 5,403,022 A | | 4/1995 | Snider |
| D358,058 S | * | 5/1995 | Anthony et al. ............. D6/333 |
| 5,823,547 A | | 10/1998 | Otobe et al. |
| 6,237,995 B1 | | 5/2001 | Dierickx |
| 6,296,259 B1 | * | 10/2001 | Anderson ..................... 280/30 |
| 6,367,821 B2 | * | 4/2002 | Thiele ......................... 280/30 |
| 6,446,990 B1 | | 9/2002 | Nania et al. |
| D482,641 S | | 11/2003 | Hansen |
| 6,655,702 B2 | * | 12/2003 | Senger ......................... 280/30 |
| 6,729,630 B2 | * | 5/2004 | Szmidt et al. ............... 280/47.25 |
| 6,910,696 B2 | * | 6/2005 | Bargery et al. .............. 280/30 |
| 6,976,685 B1 | * | 12/2005 | King et al. .................. 280/30 |
| 6,986,518 B1 | * | 1/2006 | Besaw ......................... 280/30 |
| 7,311,353 B1 | * | 12/2007 | Johnson ....................... 297/130 |
| 7,506,921 B1 | * | 3/2009 | Sigmon et al. .............. 297/130 |
| 7,540,507 B1 | * | 6/2009 | Kennedy ...................... 280/30 |
| 7,543,886 B2 | * | 6/2009 | Gutierrez-Hedges et al. .......................... 297/118 |
| 7,600,766 B2 | * | 10/2009 | Erskine ....................... 280/47.25 |
| 7,871,099 B2 | * | 1/2011 | Gilbertson et al. .......... 280/642 |
| 2002/0060444 A1 | * | 5/2002 | Cote ............................ 280/648 |
| 2008/0079293 A1 | | 4/2008 | Hedges et al. |

FOREIGN PATENT DOCUMENTS

| | | |
|---|---|---|
| DE | 102007023509 | 11/2008 |
| EP | 0466429 | 1/1992 |
| EP | 0639490 | 2/1995 |
| FR | 2745765 | 9/1997 |
| GB | 2231537 | 11/1990 |
| GB | 2409970 | 7/2005 |
| WO | WO 01/79022 | 10/2001 |
| WO | 03/008228 | 1/2003 |
| WO | 2008/141778 | 11/2008 |
| WO | 2010/119446 | 10/2010 |

OTHER PUBLICATIONS

U.S. Appl. No. 13/263,884, filed Oct. 11, 2011, Mazar et al.
U.S. Appl. No. 13/542,255, filed Jul. 5, 2012, Mazar et al.
U.S. Appl. No. 13/542,260, filed Jul. 5, 2012, Mazar et al.
U.S. Appl. No. 61/212,773, filed Apr. 16, 2009, Mazar et al.
Gogo Kidz Travel Mate, Convert your car seat into a stroller, toddler's travels, http://www.toddlerstravels.com/product-pages/gogo-kidz-travelmate.php, accessed Oct. 4, 2012.
The All in One Child Travel Seat, http://www.hammacher.com/Product/Default.aspx?sku=77956&refsku=67232, accessed Oct. 3, 2012.
U.S. Appl. No. 13/542,255, filed Dec. 14, 2012, Office Action.
U.S. Appl. No. 13/542,260, filed Oct. 25, 2012, Office Action.
U.S. Appl. No. 13/542,260, filed Dec. 31, 2012, Notice of Allowance.
European Search Report from European Application No. EP12171580 dated Feb. 27, 2013.
European Search Report from European Application No. EP12171594 dated Feb. 27, 2013.
European Search Report from European Application No. EP12171606 dated Feb. 27, 2013.
U.S. Appl. No. 13/542,255, mailed Feb. 6, 2013, Notice of Allowance.

* cited by examiner

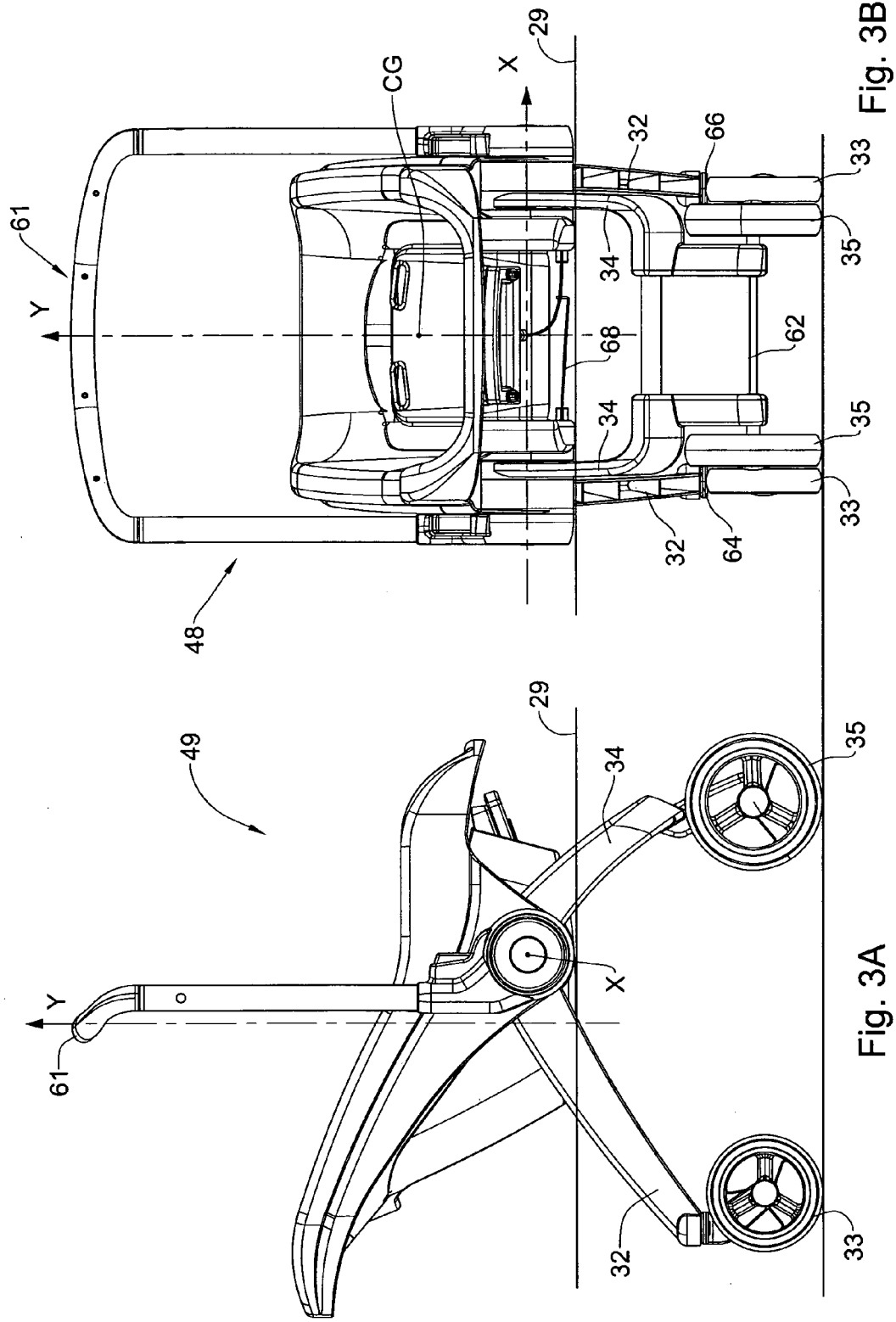

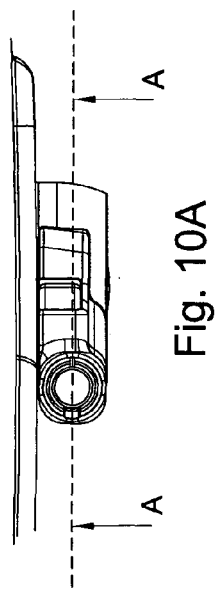
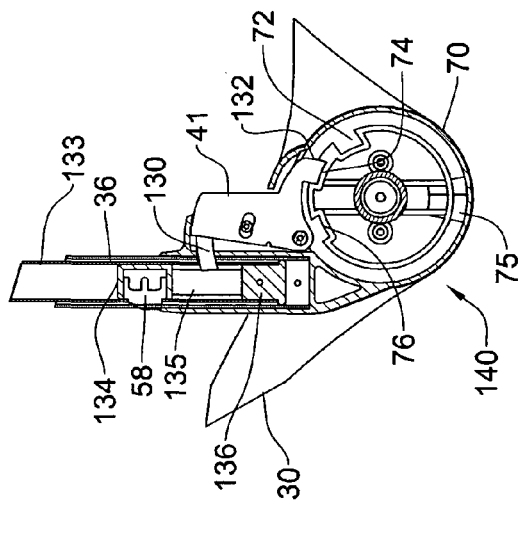
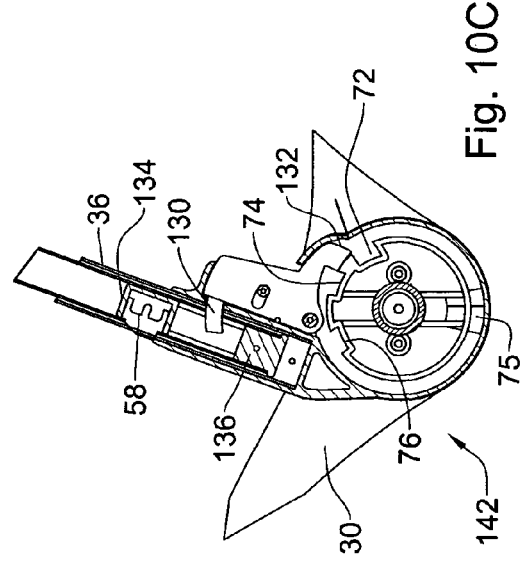
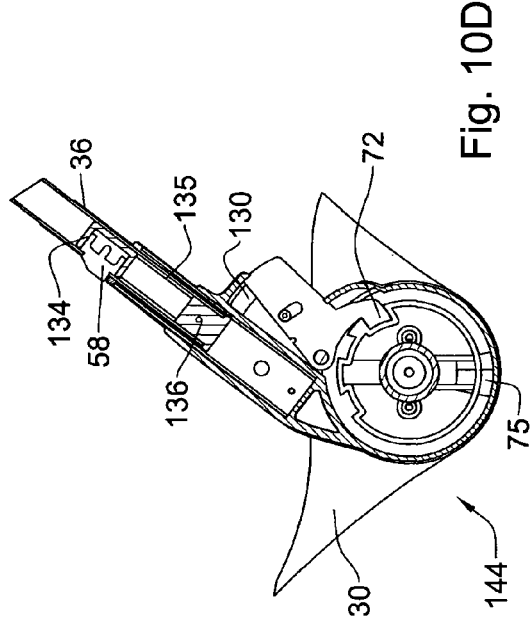

BABY SAFETY CAR SEAT CONVERTIBLE INTO A ROLLABLE BABY SEAT

CROSS-REFERENCE TO RELATED APPLICATIONS

This application is a continuation of U.S. application Ser. No. 13/263,884 filed on 11 Oct. 2011, which is a U.S. Nationalization of PCT International Application No. PCT/IL2010/000307 filed 18 Apr. 2010, which claims priority to U.S. Provisional Patent Application No. 61/212,773 filed 16 Apr. 2009, the contents of each of the foregoing applications are incorporated herein, in their entirety, by this reference.

FIELD OF THE INVENTION

This invention relates to a baby car seat, which can be used as a baby carrier and can be converted to become rollable for use, for example, as a baby carriage.

BACKGROUND OF THE INVENTION

WO 01/79022 discloses one example of a convertible baby car seat of the kind, to which the subject matter of the present application refers.

SUMMARY OF THE INVENTION

In accordance with one aspect of the subject matter of the present application, there is provided a baby safety car seat having, at least when in use, a state in which it is convertible into a rollable baby seat, and comprising at least in said state:
  a lower, support portion including a seat lowermost area configured to contact an external surface to which the seat is to be mounted, and defining an imaginary horizontal base plane, and two leg attachment areas on two sides of the lowermost area;
  an upper, seating portion having a front, head area and a rear, feet area, the head area being spaced from the base plane to a distance greater than the feet area; and
  a right and left pair of front and rear legs, the legs of each pair having distal ends associated with wheels and proximal ends articulated to the seat lower portion at the corresponding leg attachment area, both legs being rotatable relative to each other and to the seat lower portion between a storage position to be taken in a safety car seat mode of the seat, in which the distal ends of the legs are disposed above said base plane, and an operational position to be taken in a rolling-carrier mode of the seat, in which the distal ends of the legs are disposed below the plane, at least one of the rear and front legs and, optionally, both legs of each pair, when in the storage position, having their distal ends disposed under said head area of the upper seating portion.

The baby safety car seat can have a horizontal axis disposed above the plane, the legs being rotatable about the axis at locations spaced from each other along that axis.

The baby safety car seat can further comprise a locking mechanism configured to perform at least one of the following functions on each pair of the legs:
  (a) to lock at least one of the legs to the lower portion of the seat in the storage position, allowing rotation of the leg when unlocked, from its storage position into its operational position;
  (b) to lock at least one of the legs, when in the operational position, to the lower portion of the seat; and
  (c) at least in the operational position of the legs, to lock the legs to each other.

Each leg can be configured to move along at least a part of its way between the storage position and the operational position under the influence of gravity.

The lower portion of the baby safety car seat can have a centrally disposed base having side surfaces terminating at lower seat edges defining a lowermost area of the seat, and two side walls, each spaced from the corresponding side surface by the leg attachment area, and in each pair of the rear and front legs, the proximal end of one of the legs can be disposed adjacent the corresponding side wall and be lockable thereto, and the proximal end of the other of the legs can be disposed adjacent the corresponding side surface of the base and be lockable thereto as well.

The front and rear legs form an angle therebetween whose operational value in the legs' operational position, is at least about 90°, and whose storage value in the legs' storage position is not greater than 20°, in particular not greater than 10°, and still more particularly is close to 0°.

The baby safety car seat can also contain a handle rotatable about a handle rotation axis from its storage or carrying position to a pushable position in which the distal end of the handle is disposed at a distance from the head area of the seat that is at least not shorter than a distance between the head and the feet areas, to bring the seat into a pushable-carriage mode, the handle being extendible to increase the distance from its distal end to the base plane.

In accordance with another aspect of the subject matter of the present application, there is provided a baby safety car seat having, at least when in use, a state in which it is convertible into a rollable baby seat, and comprising at least in said state:
  a lower, support portion including a seat lowermost area configured to contact a vehicle surface to which the seat is to be mounted and defining an imaginary horizontal base plane, and two leg attachment areas on two sides of the lowermost area;
  an upper, seating portion having a front, head area and a rear, feet area, the head area being spaced from the base plane to a distance greater than the feet area; and
  a right and left pair of front and rear legs, the legs of each pair having distal ends associated with wheels and proximal ends articulated to the seat lower portion at the corresponding leg attachment area, both legs being rotatable relative to each other and to the seat lower portion between a storage position to be taken in a safety car seat mode of the seat, in which the distal ends of the legs are disposed above said base plane, and an operational position to be taken in a rolling-carrier mode of the seat, in which the distal ends of the legs are disposed below said plane; and
  a right and a left locking mechanism each disposed in the corresponding legs attachment area and configured to perform at least one of the following functions on the pair of the legs associated therewith: (a) to lock at least one of the legs to the lower portion of the seat in the storage position, allowing rotation of the leg when unlocked, from the storage position into the operational position; (b) to lock at least one of the legs, when in the operational position, to the lower portion of the seat; and (c) to lock the legs to each other.

Each locking mechanism can comprise a first locking arrangement having two locking members each for locking to the lower portion of the seat one of the front and rear legs of each pair and a second locking arrangement configured to lock the legs of each pair to each other, the second locking arrangement being optionally constituted by a locking member of the first locking arrangement.

In accordance with a further aspect of the subject matter of the present application, there is provided a baby safety car seat having, at least when in use, a state in which it is convertible into a rollable baby seat, and comprising at least in said state:

- a lower, support portion including a seat lowermost area configured to contact a vehicle surface to which the seat is to be mounted and defining an imaginary horizontal base plane, and two leg attachment areas on two sides of the lowermost area;
- an upper, seating portion having a front, head area and a rear, feet area, the head area being spaced from the base plane to a distance greater than the feet area;
- a handle having a handle distal end and two handle proximal ends at which the handle is attached to the lower portion of the seat so as to be rotatable about a horizontal handle rotation axis parallel to and lying above said horizontal plane, between a storage position in which the handle distal end is disposed adjacent the head area of the upper portion of the seat and at least a carrying position, in which the handle has an orientation transverse to its rotation axis and is disposed between the head and the feet areas of the upper portion of the seat; and
- a right and left pair of front and rear legs, the legs of each pair having distal ends associated with wheels and proximal ends articulated to the seat lower portion at the corresponding leg attachment area, both legs being rotatable relative to each other and to the seat lower portion between a storage position to be taken in a safety car seat mode of the seat, in which the distal ends of the legs are disposed above said base plane, and an operational position to be taken in a rolling-carrier mode of the seat, in which the distal ends of the legs are disposed below said plane, the operational position of the legs being combinable with the carrying position of the handle.

The handle can be rotatable from its storage or carrying position to a pushable position in which the distal end of the handle is disposed at a distance from the head area of the seat that is at least not shorter than a distance between the head and the feet areas and extendible in the pushable position to increase the distance from its distal end to said plane.

In accordance with a still further aspect of the subject matter of the present application, there is provided a baby safety car seat having, at least when in use, a state in which it is convertible into a rollable baby seat, and comprising at least in said state:

- a lower, support portion including a seat lowermost area configured to contact an external surface to which the seat is to be mounted, and defining an imaginary horizontal base plane, and two leg attachment areas on two sides of the lowermost area;
- an upper, seating portion having a front, head area and a rear, feet area, the head area being spaced from the base plane to a distance greater than the feet area; and
- a right and left pair of front and rear legs, the legs of each pair having distal ends associated with wheels and proximal ends articulated to the seat lower portion at the corresponding leg attachment area, each leg being rotatable relative between a storage position to be taken in a safety car seat mode of the seat, in which the distal end of the leg is disposed above said base plane, and an operational position to be taken in a rolling-carrier mode of the seat, in which the distal end of the leg is disposed below said plane, via an intermediate position of the leg; one of the legs being rotatable from its storage position to its intermediate position, and the other leg being rotatable between its intermediate position and its operational position, at least partially under the influence of gravity force acting thereon;
- a locking mechanism configured for locking the legs of each pair to each other at least in the intermediate position of said one of the legs.

The locking mechanism can be configured to perform at least one of the following functions: (a) to lock at least one of the legs to the lower portion of the seat in the storage position, allowing rotation of the leg when unlocked, from its storage position into its operational position; (b) to lock at least one of the legs, when in the operational position, to the lower portion of the seat; and (c) at least in the intermediate position of the legs, to lock the legs to each other.

The baby safety car seat according to the subject matter of the present application can have features of different aspects described above, or their equivalents, in any combination thereof, which can also be combined with any feature/s of the seat described in Detailed Description of Embodiments presented below, or their equivalents.

In addition, the baby safety seat according to the subject matter of the present application can have permanent and attachable components, the former allowing the use of the seat in a conventional manner and the latter being attachable thereto to bring the seat into a state allowing its conversion into a rollable baby seat.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 3A and 3B are side and front views, respectively, of the seat assembly shown in the preceding figures, in its rolling carrier mode shown in FIG. 1B;

FIG. 10A is a top view of a handle mechanism used in the seat assembly shown in FIGS. 1A to 3B;

FIG. 10B to 10D are cross sectional views of the handle mechanism, taken line A-A in FIG. 10A, in different positions of the handle.

DETAILED DESCRIPTION OF EMBODIMENTS

Figure 1A:
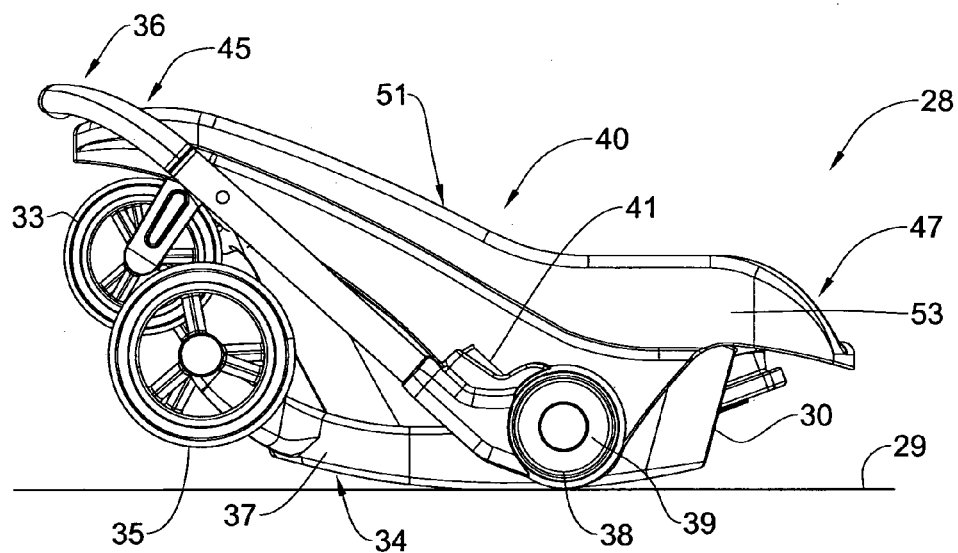
FIG. 1A to 1C are views of a baby safety car seat assembly according to the subject matter of the present application, in a storage mode, rolling-carrier mode and pushable-carriage mode.

FIGS. 1A to 2C illustrate a convertable baby safety car seat assembly 28, according to an embodiment of the present invention, in different modes of its operation. These modes of operation are a storage mode 40 shown in FIG. 1A, a rolling-carrier mode 48 shown in FIG. 1B, a pushable-carriage mode 52 shown in FIG. 1C, as well as a normal carrying mode 46 shown in FIG. 2A, which also constitutes an operational intermediate mode between the modes 40 and 48, a short-handle pushable-carriage mode 60, which constitutes in operational intermediate mode between the modes 48 and 52, and non-operational intermediate mode 50 via which the seat is converted from its mode 46 into its mode 48.

In the following description, the convertable seat assembly 28 will also be referred to as a combination-seat or a seat and carriage combination.

With reference to FIGS. 3A to 5, the combination-seat 28 comprises a baby seat 30 (FIGS. 4A and 4B) having a lower support portion 44 including a seat lowermost area 49 with a seat lowermost surface 49' (FIG. 4A) configured to contact a vehicle surface to which the seat is to be mounted (not shown) and an upper seating portion 51 with a front head area 45 and a rear feet area 47. The seat lowermost surface 49' defines an imaginary horizontal base plane 29, from which the head area 45 is spaced to a greater distance than the feet area 47. The combination-seat further comprises two leg attachment areas 73 (shown in FIG. 3) on two sides of the lowermost area located above the base plane and extending along a horizontal axis X of the assembly.

The combination-seat 28 further comprises a pair of front legs-and-wheels assemblies 32 and a pair of rear legs-and-wheels assemblies 34. Each front legs-and-wheels assembly 32 comprises front supports legs 31 and front wheels 33. Rear legs-and-wheels 34 assembly comprises rear supports legs 37 and rear wheels 35.

Each leg support in each of the above assemblies has a distal end 125 associated with a wheel and a proximal end 127 articulated to the seat lower portion at the corresponding leg attachment area 73. Each leg attachment area 73 accommodates the proximal ends of one rear and one front leg so that these legs are rotatable relative to each other and to the seat lower portion between a storage position to be taken in a safety car seat mode of the seat (FIG. 1A), in which the distal ends 125 of the legs are disposed above the base plane 29, and an operational position to be taken in a rolling-carrier mode of the seat (FIG. 1B), in which the distal ends 125 of the legs are disposed below the plane 29.

Figure 1B:
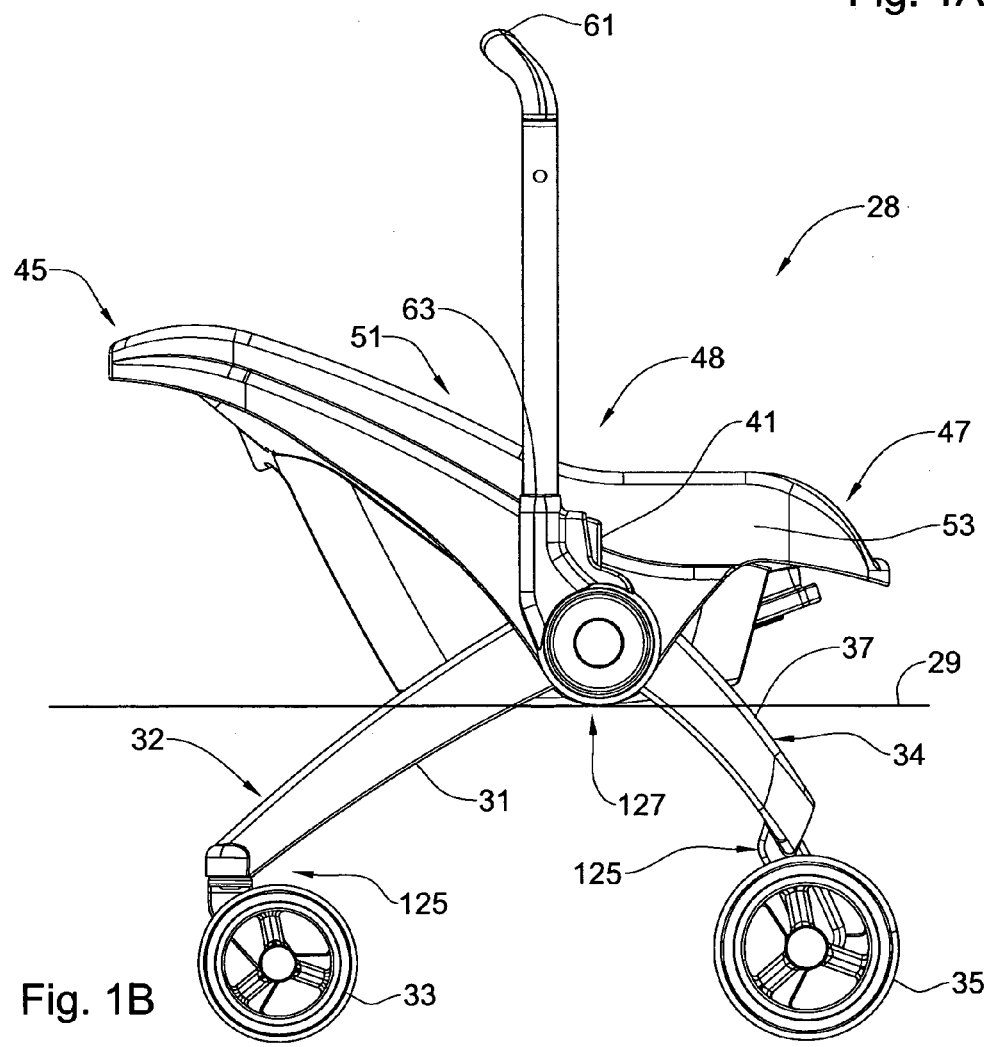
Figure 1C:
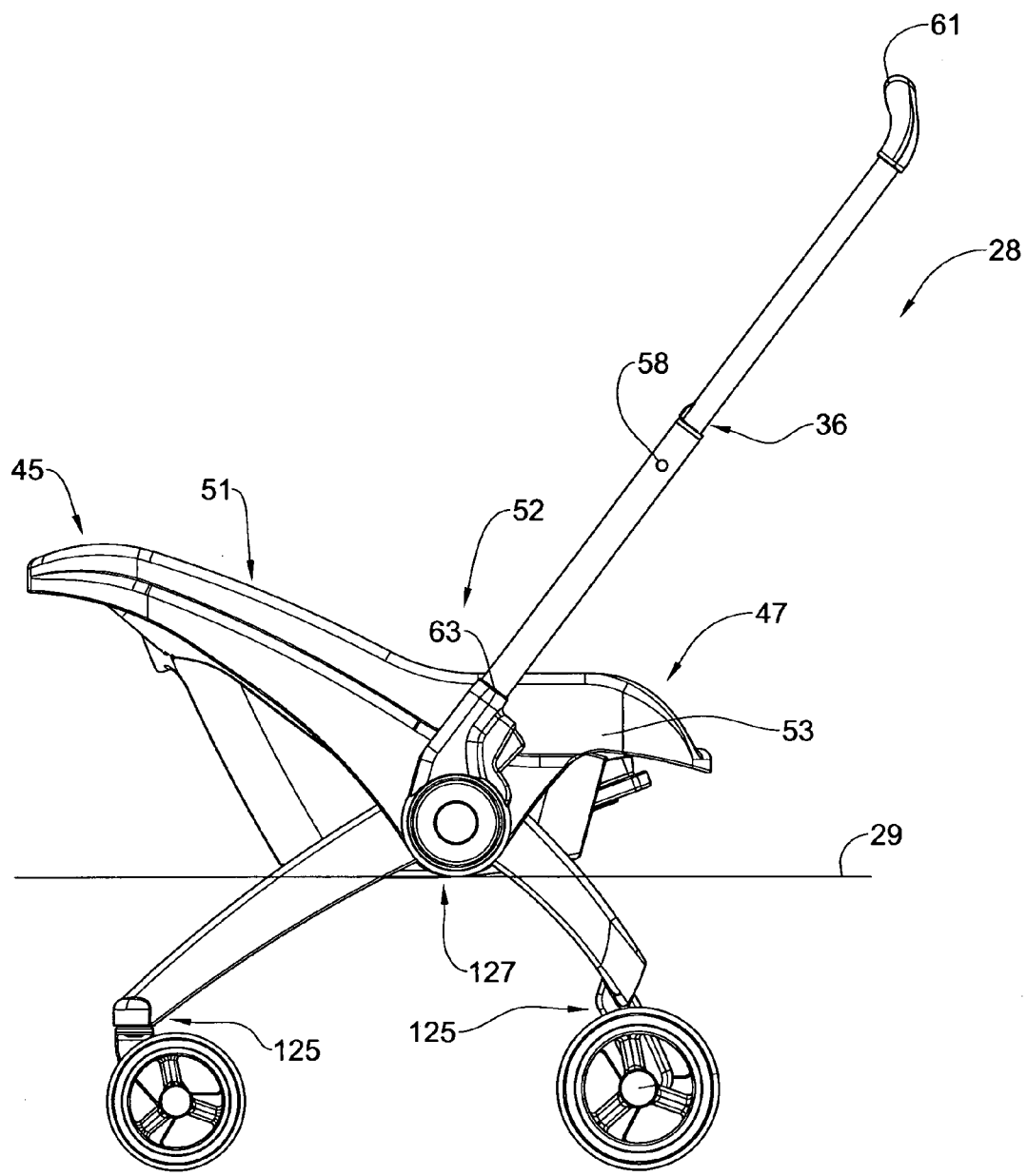
Figure 2A:
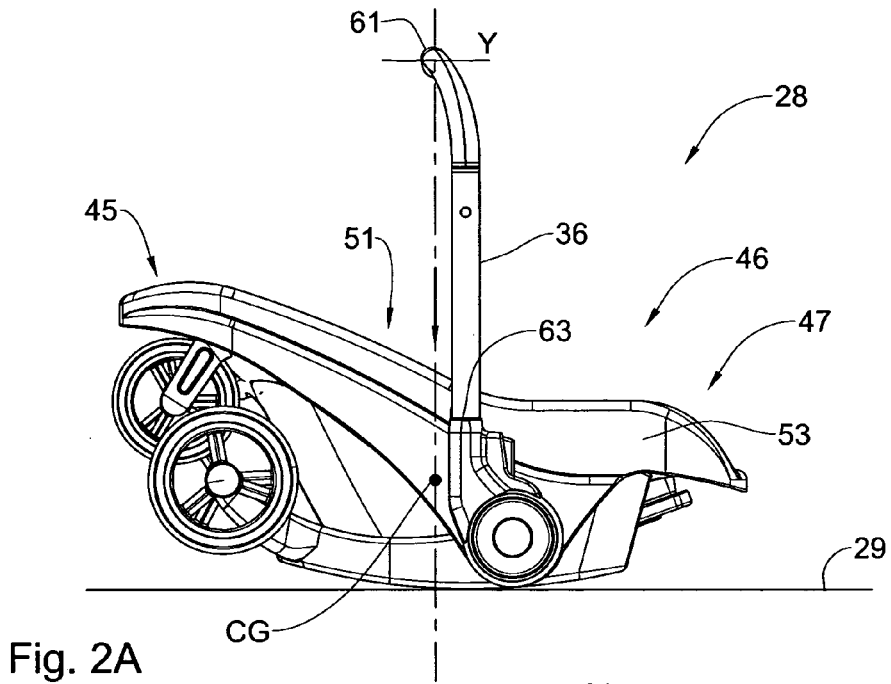
FIG. 2A shows the seat assembly shown in FIGS. 1A to 1C, s in its carrying mode.

Both legs of each pair, when in the storage position, have their distal ends 125 disposed under the head area 45 of the upper seating portion 51. The combination-seat further contains an extendable handle 36 having a handle distal end 61 and handle proximal end 63 and configured to rotate about a horizontal handle rotation axis (coinciding with the axis X) from a storage position in the storage mode of the combination-seat 28 (FIG. 1A) to a carrying position in the carrying and rollable-carrier modes of the combination-seat (FIGS. 2A, 1B) and pushable position in the pushable-carriage mode (FIGS. 1C, 2C).

The baby seat 30, front legs-and-wheels assembly 32, rear legs-and-wheels assembly 34, and handle 36 will all be described in more detail below.

Baby seat 30 comprises a left and right locking mechanism 38 disposed in the corresponding legs attachment area 73 having a first locking arrangement 79 configured to lock each pairs of legs to the lower portion of the seat in their storage position, and allowing rotation of the legs when unlocked, from their storage position into their operational position, a second locking arrangement 102 configured to lock the legs of each pair to each other, at least during a part of their way between their storage and operational positions and a horizontal axis X, to which the two pairs of legs-and-wheels and the handle attach, and by which the two pairs of legs-and-wheels and the handle rotate relative to the baby seat about the axis X.

Figure 2B:
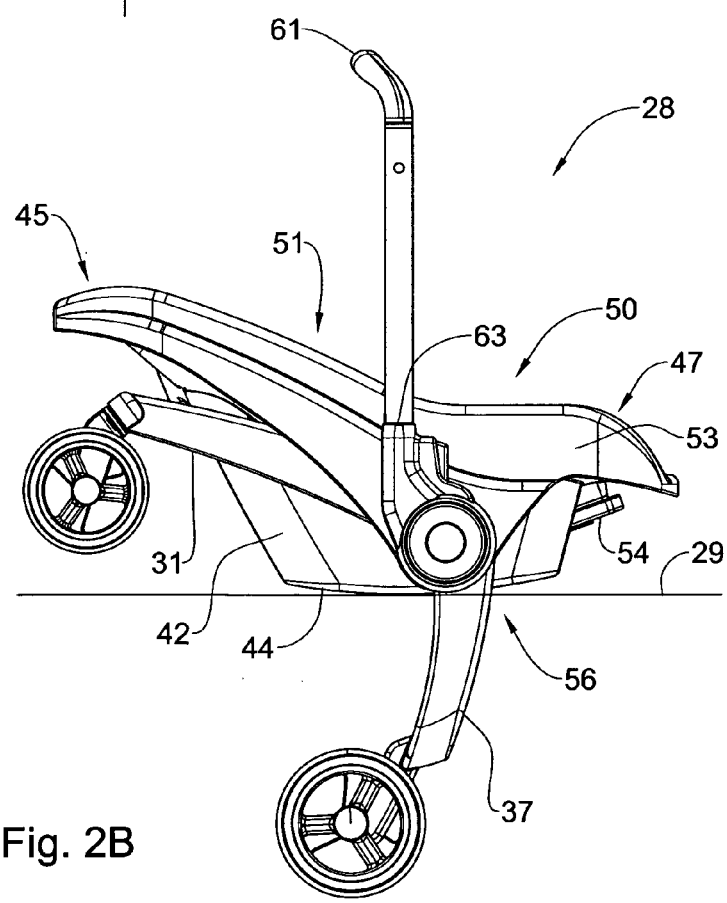
FIG. 2B shows the seat assembly shown in FIGS. 1A to 1C, and FIG. 2A, in an intermediate mode between its storage mode and rolling-carrier mode shown in respective FIGS. 1A and 1B.
Figure 2C:
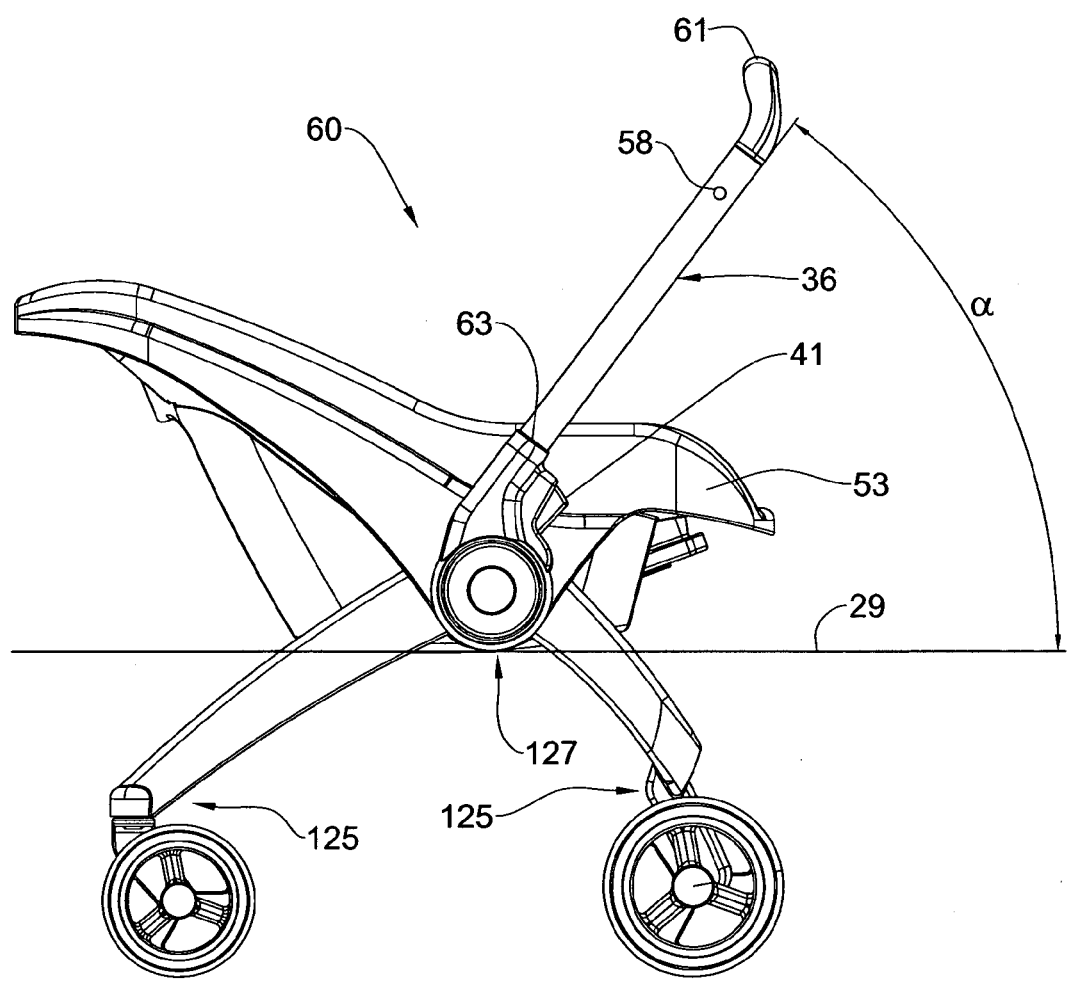
FIG. 2C shows the seat assembly shown in FIGS. 1A to 1C, in its intermediate mode between the rolling-carrier mode shown in FIG. 1B and pushable-carriage mode shown in FIG. 1C.
Figure 4B:
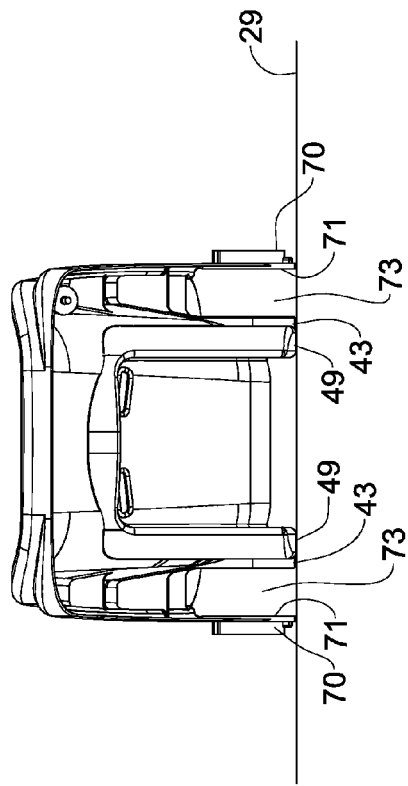
FIG. 4A to 4D are side, front, top and a perspective view, respectively, a baby seat constituting a part of the seat assembly shown in the preceding figures.
Figure 4D:
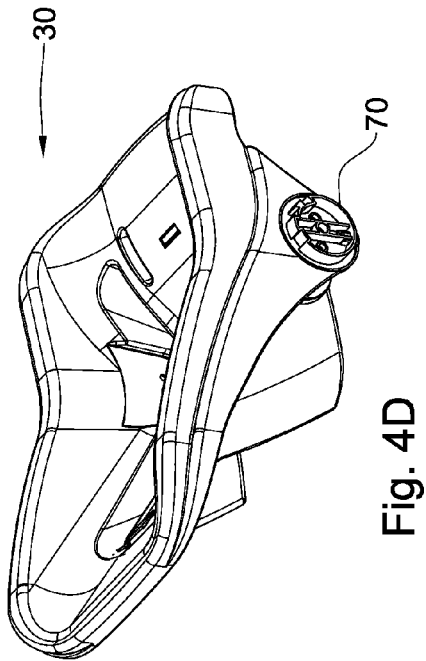
Figure 4A:
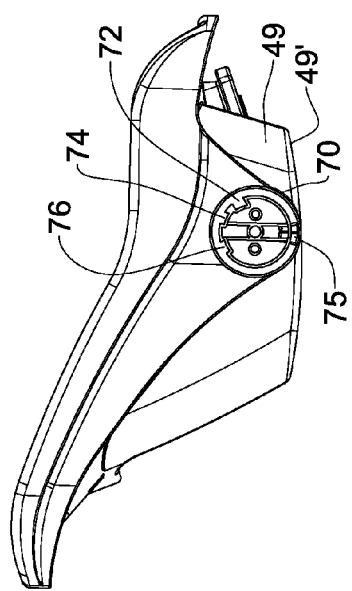
Figure 4C:
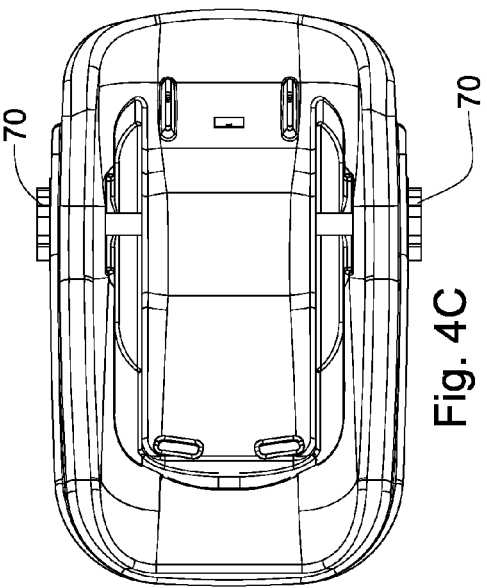

The baby seat 30 has a vertical axis Y passing through the distal end 61 of the handle and perpendicular to base plane 29, as seen in FIG. 2.

Locking mechanism 38 comprises two generally similar hinges 39, the hinges typically being mirror images of each other. Only one of the hinges is visible in FIGS. 1A to 2C. For each of the four configurations of combination-seat 28, the locking mechanism maintains the seat 30, the legs-and-wheels 32 and 34, and the handle 36 in fixed desired positions relative to one another. As will be appreciated from the description below, locking mechanism 38 allows handle 36 and the sets of legs-and wheels 32, 34 to rotate generally independently, around a common axis.

In a first configuration 40 of combination-seat 28, front legs-and-wheels 32, rear legs-and-wheels 34, and handle 36 are held by mechanism 38 in positions that fold the legs-and-wheels and handle to be generally non-protrusive from baby seat 30. In configuration 40 the legs-and-wheels and handle are at the back of, and generally conform with and partially recess into, the baby seat. In the first configuration, (and also in the second, third and fourth configurations described below) handle 36 is locked.

In order to further facilitate the folding of legs-and-wheels to be non-protrusive, the distances between rear wheels 35 of rear legs-and-wheels 34 are configured to be shorter than the distance between front wheels 33 of front legs-and-wheels 32, so that the front wheels may at least partly overlap the rear wheels, as is shown in configuration 40. In an alternate embodiment of the present invention, the distances between the front wheels are shorter than the distances between the back wheels, to facilitate the non-protrusive aspect. In addition, while the rear wheels may be joined by an axle, as described below but not shown in FIG. 1, front wheels 33 are typically only connected to their respective legs, so further enhancing the non-protrusive ability of the legs-and-wheels by allowing the overlap of the front wheels and the rear wheels.

In this non-protrusive state, i.e., in configuration 40, combination-seat 28 may be conveniently positioned on the seat of passenger-carrying vehicle such as an automobile or truck. Thus, in configuration 40, the combination-seat may be used in a similar manner as prior art baby seats, e.g. a baby may be placed in the combination-seat, and safety straps of the automobile or truck may be positioned around the combination, so as to prevent the combination-seat from moving. In this configuration the combination seat 28 can be assembled to the vehicle as a rear facing baby seat.

Baby seat 30 typically has an upper, seating section 53 and a lower, base section 42 fixedly coupled to the upper seating section 53, the lower section having lower edges 44 which are advantageously formed as a curve. Although the combination-seat comprises front legs-and-wheels 32, rear legs-and-wheels 34, and handle 36, these elements are folded, as described above. The folding is such that in configuration 40 the combination-seat may be placed on a flat surface, so that curved lower edges 44 are unobstructed by the handle and the legs-and-wheels so allowing the combination-seat to be rocked on the surface. Typically, as shown in configuration 40 (and in configuration 46 described below), edges of supports 37 are configured to conform with lower edges 44. This ensures that the legs fold when the combination-seat is placed on a flat surface.

Because the legs-and-wheels and handle fold to be at the back of the baby seat, there is no restriction in placing a baby in the seat and positioning the safety straps, so that the combination-seat in configuration 40 acts as a prior art baby seat. Also, there is no restriction on placing the combination-seat on a surface and rocking it on the surface using curved edges 44.

In a second configuration 46 of the combination-seat, front legs-and-wheels 32 and rear legs-and-wheels 34 remain positioned as per the first configuration. However, handle 36 has been moved into a vertical position, from its position in the first configuration. In configuration 46 the handle may be used to conveniently carry the combination-seat, so that in this configuration, the combination-seat acts as a bassinet. Also in configuration 46, lower edges 44 may be placed on a flat surface, and the combination-seat may be rocked on the surface, typically using the handle to perform the rocking.

To transfer between configuration 40 and configuration 46, a user of the combination-seat presses on two cams 41 so that the handle is free to move between the two positions. Cam 41 is shown in more detail, and its operation is explained, with reference to FIGS. 10B to 10D. The pressure on cams 41 frees the locking mechanism of the hinges, allowing handle 36 to rotate, in this case between configurations 40 and 46 in which the combination seat can be used as a baby carrier. In configuration 46 the handle 36 is located such that its end 61 to be held by the user is disposed on the axis Y passing through the center of gravity of the assembly CG, allowing the user to lift the seat from the ground and keep it parallel to the ground while carrying the seat with the baby therein.

In a third configuration 48 of the combination-seat, front legs-and-wheels 32 and rear legs-and-wheels 34 rotate around locking mechanism 38 to be below curved edges 44. Handle 36 remains in the same position as per the second configuration 46. For clarity, configuration 50 illustrates the positions of the legs-and-wheels as the combination-seat moves between the second and third configurations. In the third configuration front legs-and-wheels 32 and rear legs-and-wheels 34 are positioned in operative positions, so that the wheels of the legs-and-wheels may be used to wheel the combination-seat. Thus, in the third configuration, the combination-seat is operative as a bassinet with legs and wheels. Typically, the wheels of one pair of legs-and-wheels are coupled to the respective pair of legs so as to be able to rotate the wheels around an axis that is orthogonal to the symmetry axis of rotation of the wheels. This freedom of rotation of one set of wheels allows the combination-seat to be easily steered in any direction. Thus, in the third configuration, the combination-seat may be operated in a similar manner to a baby carrier.

To transfer between the second and third configurations, each leg is configured to move along at least a part of its way between the storage position and the operational position under the influence of gravity. The combination-seat user operates a spring-loaded legs unlocking mechanism 56, using a handle 54. Mechanism 56, not visible in FIGS. 1A to 2C, is described in more detail below, with reference to FIG. 5. The mechanism locks the two sets of legs-and-wheels in either the lowered position of the third configuration, or the folded recessed position of the second configuration. Between the two locked positions, the sets of legs-and-wheels are free to rotate around locking mechanism 38. Typically, in moving from second configuration 46 to third configuration 48 the user pulls on handle 54, and gravity acts to lower the sets of legs-and-wheels to their locked operating position of configuration 48. To move from configuration 48 to configuration 46, the user pulls on handle 54, and provides an initial push to the rear set of legs-and-wheels after which the user lowers the seat, with the help of the seat's own weight to their locked position in configuration 46.

In transferring between second configuration 46 and third configuration 48, hinges 39, as explained in more detail below, limit the rotation of front legs-and-wheels 32 to approximately 70°, and the rotation of rear legs-and-wheels 34 to approximately 120°. The angle between the legs in the operational position is at approximately 100°, and in the storage position the value is close to 0°.

In an intermediate configuration 60 of the combination-seat, front legs-and-wheels 32 and rear legs-and-wheels 34 are in the same positions, relative to seat 30, as in third configuration 48. In configuration 60 handle 36 is initially in a non-extended arrangement, as indicated in configurations 46 and 48. In the intermediate configuration the handle rotates from the third configuration 48, around locking mechanism 38, so as to be at an angle α to the base plane 29.

Locking mechanism 38 is used to transfer from the third configuration to the intermediate configuration 60, the user pressing on the two cams 41 so that the handle is free to move between the positions of the two configurations. Locking mechanism 38 may be configured so that the angle α of the handle to the vertical axis Y in the intermediate configuration is any convenient angle.

In a fourth configuration 52 handle 36 extends along its own length to form a lengthened handle to increase the distance from its distal end 61 to the base plane 29, in an extended arrangement shown in FIG. 1C, the handle being designed to telescope within itself. The extension of the handle may be by any convenient length. A user of the combination-seat extends the handle from the intermediate configuration 60 to configuration 52, wherein spring stoppers 58 lock the handle in its extended state. Stoppers 58 act in a similar fashion to the control of an umbrella, allowing a user of the combination-seat to retract the handle by pushing in on the stoppers. Spring stoppers 58 are described in more detail with reference to FIG. 10A to 10D, The combination-seat is constructed so that only in the fourth configuration may the handle be extended.

Typically, the angle of the handle and the amount of its extension in configuration 52 are selected so that an end of the handle used to push or pull the combination-seat in configuration 52 is at a convenient height for an adult to operate the combination-seat as a baby carriage, when both the adult and the carriage are on a level surface. Thus, in configuration 52, the combination-seat may be operated in a similar manner to a baby carriage.

FIGS. 3A and 3B show a side view and a front view of third configuration 48, showing overall dimensions in mm., according to an embodiment of the present invention. It will be understood that dimensions given in FIGS. 3A and 3B, and in other figures of the present disclosure, are by way of example, and any other convenient dimensions may be implemented. The front view (FIG. 3B) illustrates the positioning and separation of rear wheels 35 and front wheels 33. As shown in the figure, rear wheels 35 are connected by an axle 62. In contrast, front wheels 33 are connected by rotatable couplings 64, 66 which allow the front wheels to be steered in any direction.

Figure 5:
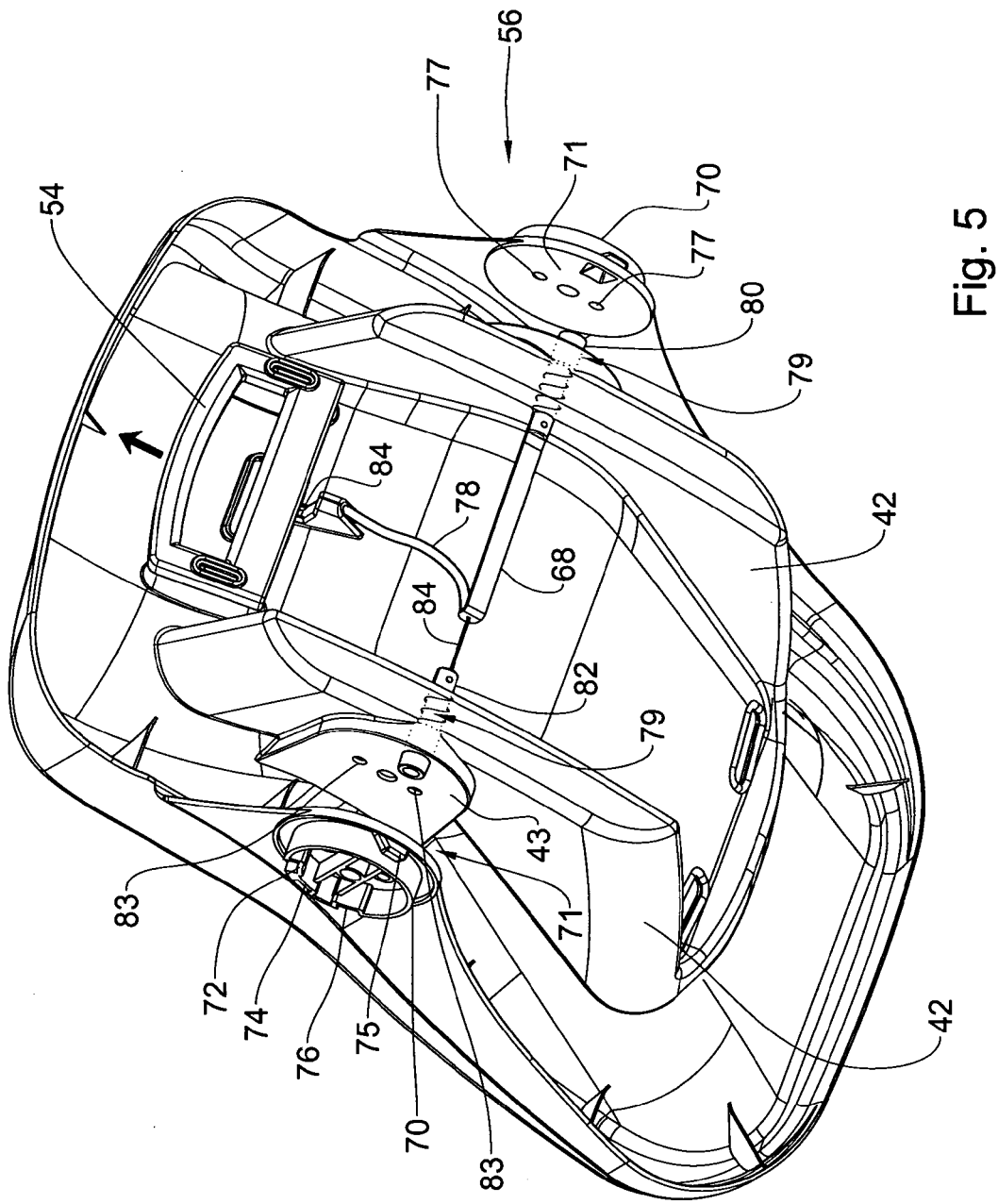
FIG. 5 is a perspective bottom view of the baby seat shown in FIGS. 4A to 4D.
Figure 6A:
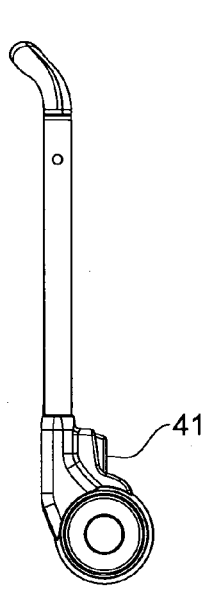
FIGS. 6A and 6B are side and front views of a handle of the baby seat shown in FIGS. 4A to 5, in its non-extended state.
Figure 6B:
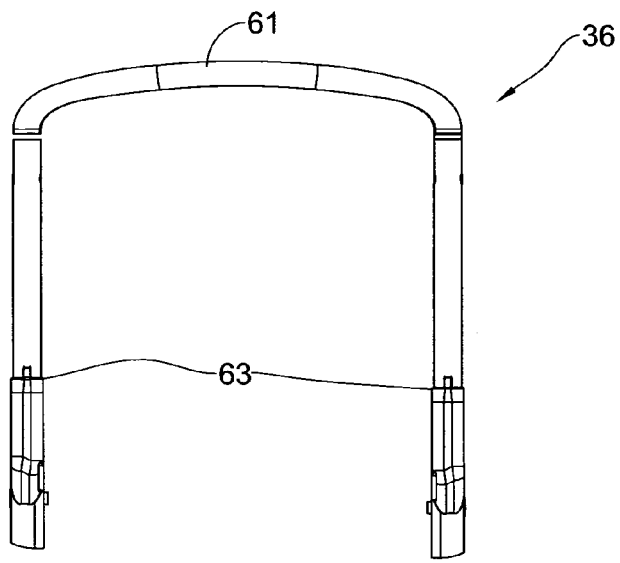
Figure 6C:
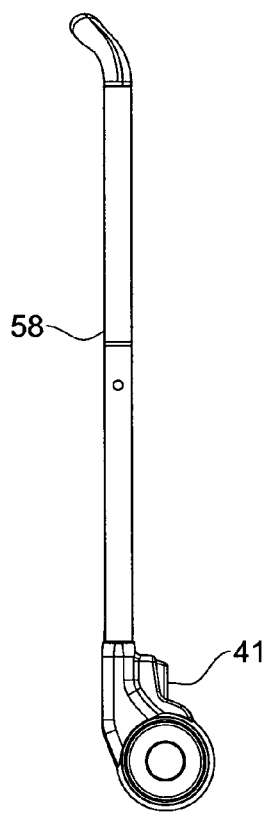
FIG. 6C is a side view of the handle shown in FIGS. 6A and 6B in its extended state.
Figure 6D:
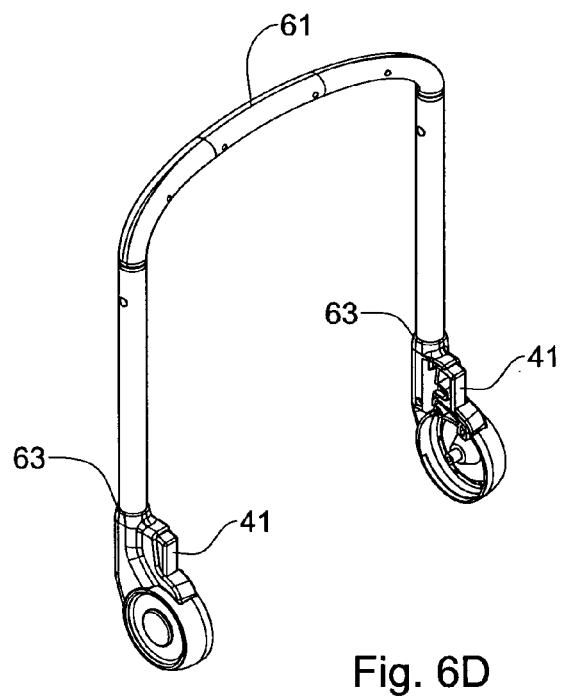
FIG. 6D is a perspective view of the handle shown in FIGS. 6A and 6B.
Figure 7A:
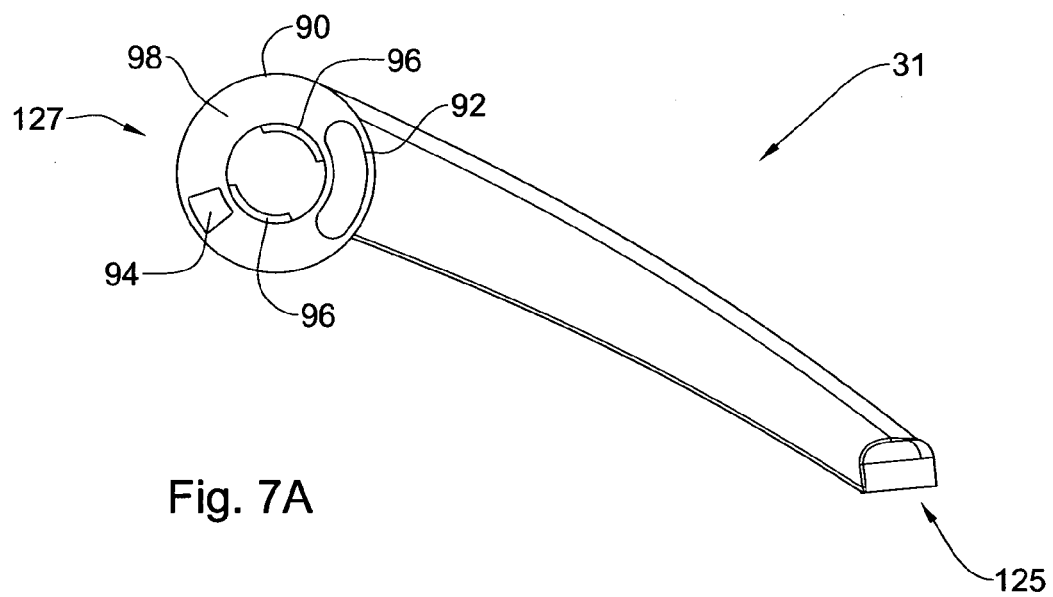
FIG. 7A to 7C are back, front and side views, respectively, of a front leg of the seat assembly shown in FIGS. 1A to 3B.
Figure 7B:
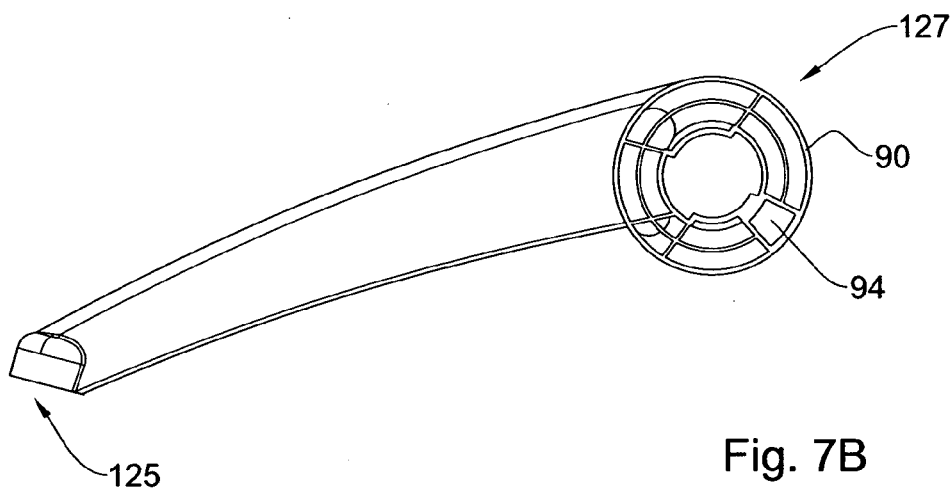
Figure 7C:
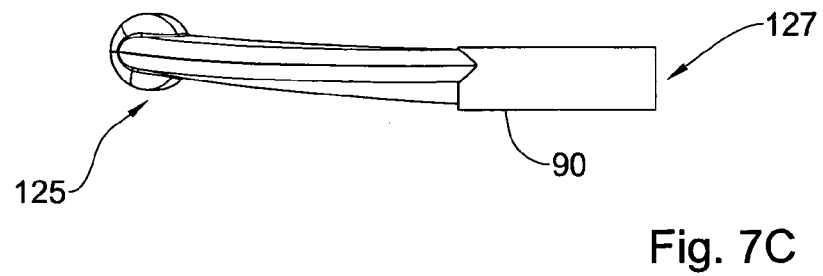
Figure 8A:
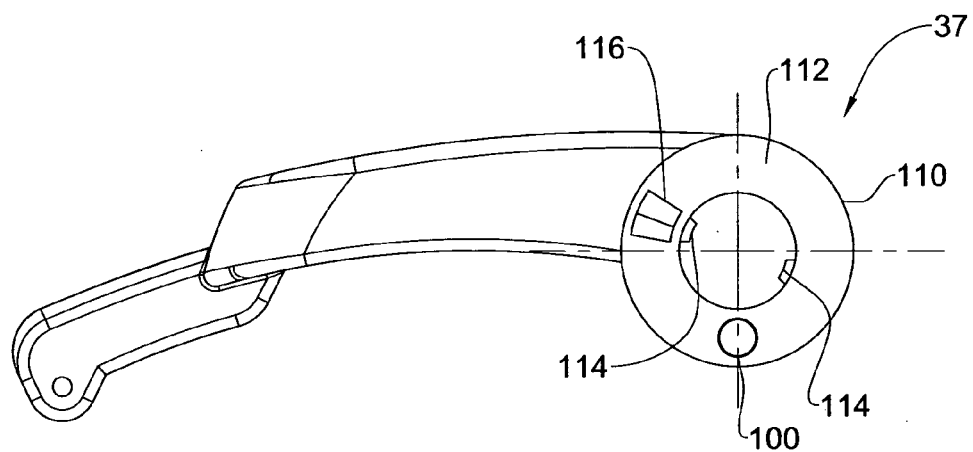
FIG. 8A to 8C are back, front and side views, respectively, of a rear leg of the seat assembly shown in FIGS. 1A to 3B.
Figure 8B:
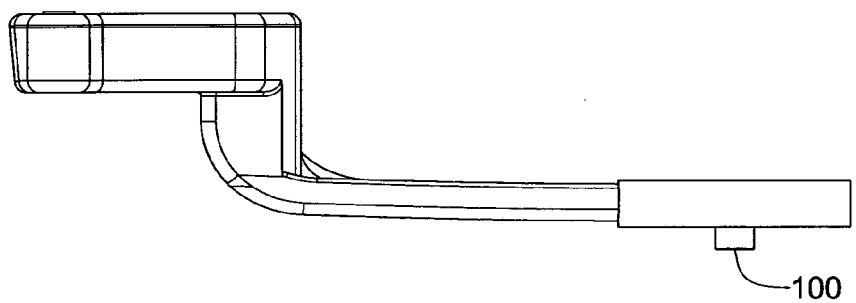
Figure 8C:
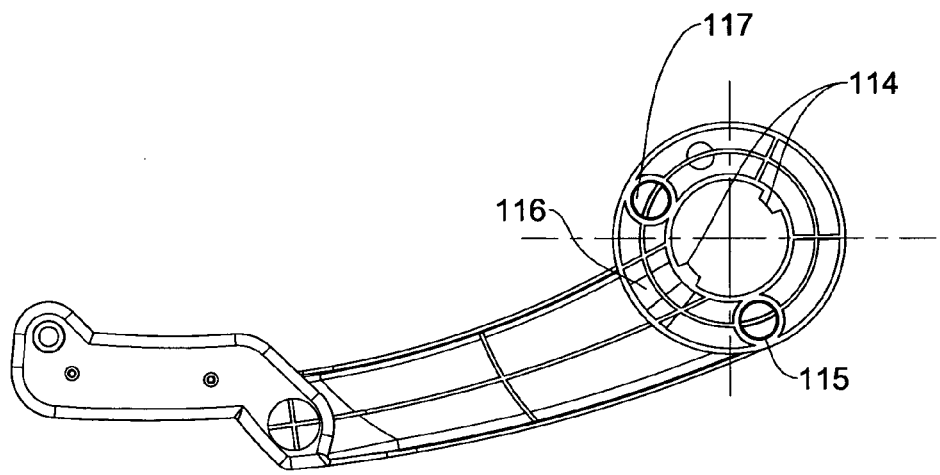

FIG. 3B also shows a shaft 68 of locking mechanism 38, described in more detail with respect to FIG. 5.

FIGS. 4A to 4D shows side, front, top and perspective views of seat 30, showing exemplary overall dimensions and some internal dimensions of the seat, according to an embodiment of the present invention. The views illustrate an outer, handle-related hinge portion 70 of one of hinges 39. As shown in the side view, portion 70 comprises three recesses 72, 74, 76, and a sloped indent 75 in a face 71, within seat 30. The recesses allow handle 36 to be locked into the three handle positions described with reference to FIGS. 1A to 1C. Hinge portion 70 and its elements are also shown in FIG. 4, and described in more detail below, with reference to FIGS. 9 and 10.

FIG. 5 shows a perspective bottom view of seat 30, according to an embodiment of the present invention. The view shows elements of locking mechanism 38 allowing transfer between the second and third configurations and elements of legs control handle mechanism 56. The transfer is accomplished by pulling on legs control handle 54, which is connected by a cabling-sleeve 78 to shaft 68. As shown by arrows in the figure, pulling on handle 54 pulls on a cable 84 within sleeve 78, causing two locking pins 80, 82 to move inwards to retracted positions. Pins 80 and 82 are spring loaded, and slide in holes within lower section 42. In their retracted positions, the pins disengage from first holes 115 (shown in FIG. 9A) located on and extending partially through the proximal ends 127 of the rear legs-and-wheels 34 allowing rotation of the legs-and-wheels between the second and third configurations. Front legs-and wheels 32 also rotate, but rather than engaging with pins 80, 82, the front legs-and-wheels are held in position by pin 102. On release of the handle 54, the pins return to their un-retracted positions engaging second holes 117 (shown in FIG. 9A) located on and extending partially through the proximal ends of the rear legs-and-wheels 34 and a radial distance away from the first holes 115, locking the legs-an-wheels in their positions for the second or third configuration. If the handle 54 is released between the two configurations, the legs-and-wheels may still rotate, but will spring lock into either the second or third configuration, whichever configuration is first.

FIGS. 6A to 6D show three views of handle 36 in its non-extended configuration (FIGS. 6A, 6B and 6D), and one view of the handle in its extended configuration (FIG. 6C), according to an embodiment of the present invention. In the non-extended configuration, cam 41 may be pushed in, so that the handle may be moved to and between the first and second configurations. In the extended configuration, cam 41 protrudes more than in the non-extended case, and acts to release the handle so it can be pulled out to its extended position. The operation of cam 41 is illustrated and described in more detail with respect to FIGS. 10A to 10D.

FIGS. 7A to 9B respectively show views of one front support 31, one rear support 37, and how the two supports couple together, according to embodiments of the present invention.

As shown in FIGS. 7A to 7C and 9A to 9B, front support 31 comprises a disc-like section 90, which is configured to rotate within hinge 39. Section 90 has an arcuate recess 92 within a face 98 of the section. A pin 100, shown in FIGS. 9A and 9B, travels within the recess and acts as a motion limiter in conjunction with pin 102 to limit the amount of rotation of support 31, relative to support 37 to approximately 90°. In addition, section 90 comprises a through hole 94 through which an interlocking sloped pin 102, shown in FIGS. 9A and 9B, passes. The purpose of pin 102 is to assist in smooth and full legs-and-wheels unfolding/folding. It prevents the front wheels from being stuck into the rear wheels while the legs are folded back. In addition, the two cam-like protuberances 96 limit the amount of rotation of support 31 in hinge 39 to approximately 70°.

As shown in FIGS. 8A to 9B, rear support 37 comprises a disc-like section 110 which is also configured to rotate within hinge 39. Section 110 has a face 112, upon which eccentric pin 100 is formed. On an internal circular surface of section 110 there are two cam-like protuberances 114 which limit the amount of rotation of support 37 in hinge 39 to approximately 180°. In addition, section 110 comprises a slanted indent 116, corresponding with the slant of sloped pin 102 into which pin 102 slides. As described above with reference to FIGS. 1A to 2C, supports 37 are typically curved so that in configurations 40 and 46, the supports conform with edges 44.

Figure 9A:
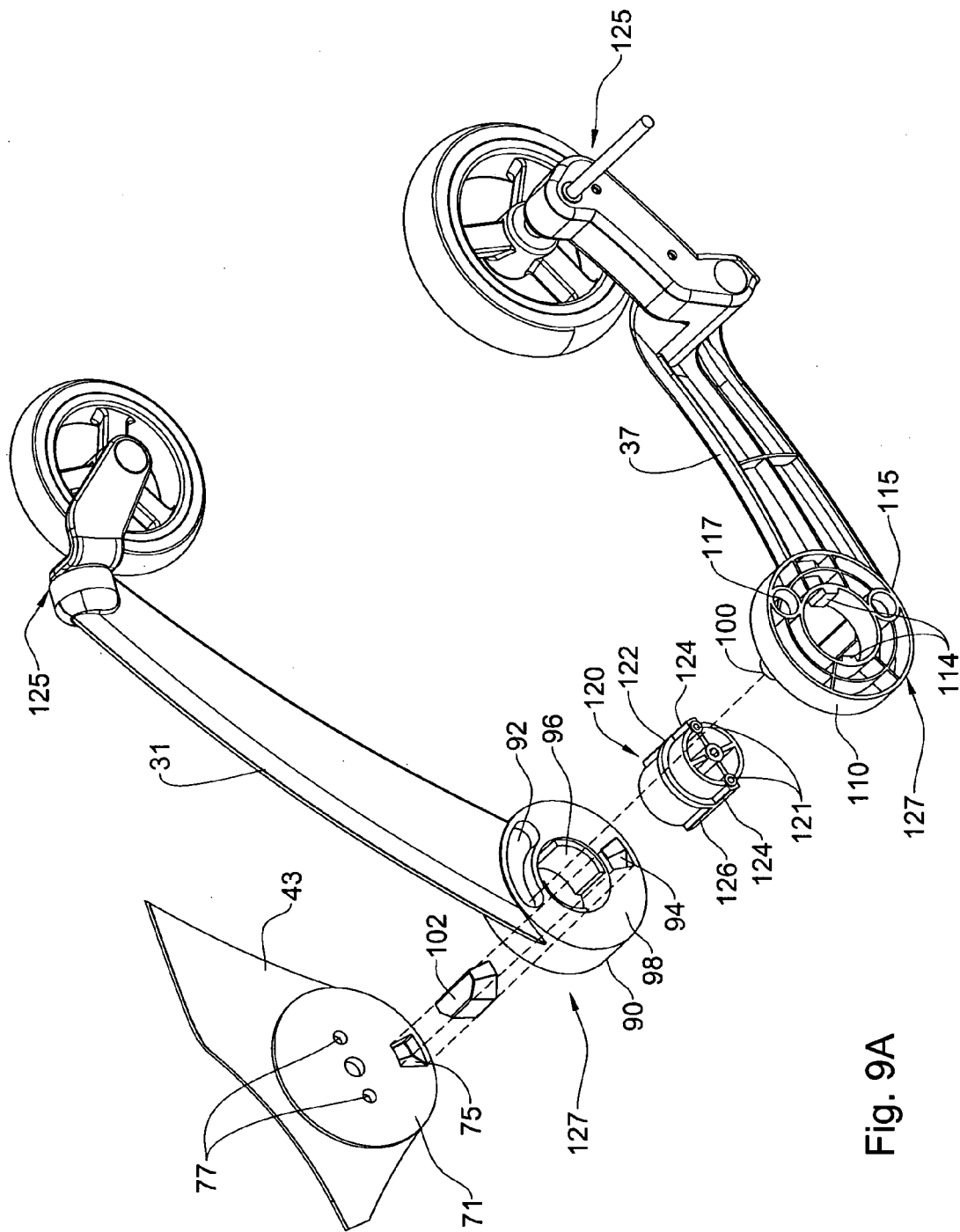
FIGS. 9A and 9B are exploded perspective views of an assembly of the front and rear legs shown in FIGS. 7A to 8C.
Figure 9B:
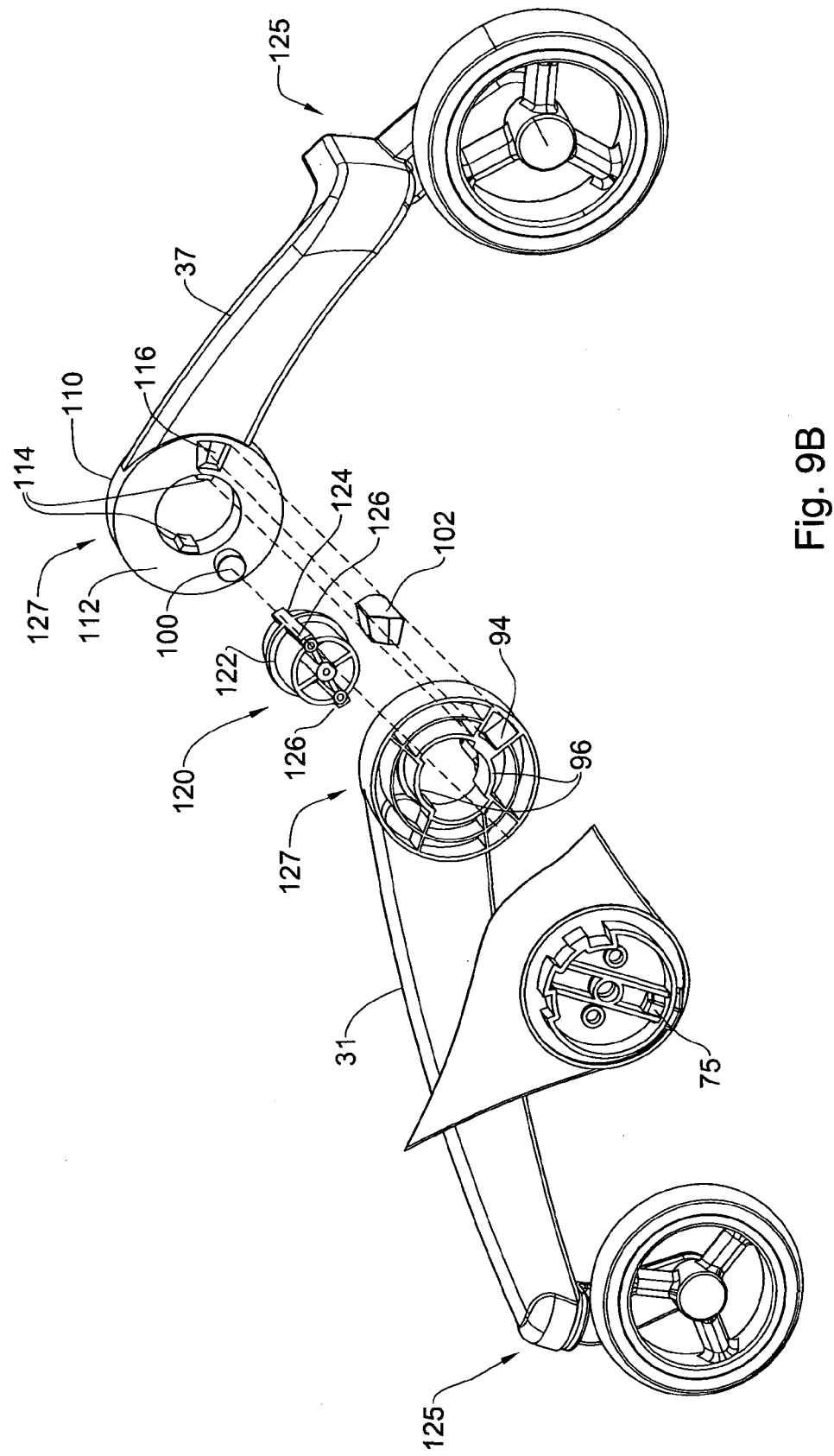

FIGS. 9A and 9B shows a first view and a second view of support 31 and 37, illustrating how the two supports couple together. Face 112 of support 37 and face 98 of support 31 butt together, so that pin 100 is able to travel in recess 92. A short cylindrical-type main axle 120 couples section 110 and section 90. The axle 120 is rigidly screw mounted to base section 42 via holes 121 located on the axle 120, holes 77 located on surface 71 and holes 83 located on surface 43 preventing the front and rear legs and wheels from falling out of the space between the side surfaces. Shaft 68 which is coupled to pins 80 and 82 is offset vertically and downwardly from the axle.

A circular ridge 122 on axle 120 acts to maintain a separation between the two sections. Straight ridges 124 of axle 120 rotate within section 110 and, by contacting protuberances 114, limit the rotation of section 110. Straight ridges 126 of axle 120, continuations of ridges 124, rotate within section 90 and, by contacting protuberances 96, limit the rotation of section 90. As explained above, support 37 rotates by approximately 180° with respect to seat 30, and support 31 rotates by approximately 90° with respect to the seat, so that the two supports rotate by approximately 90° with respect to each other. The rotations of sections 90 and 110 by these limited amounts is achieved, as described above, by axle 120, its ridges, pin 102 and pin 100 operating in recess 92.

FIGS. 10A to 10D show details of hinge 39, and the movement of handle 36 within the hinge, between configurations, according to an embodiment of the present invention. Handle 36 comprises cam 41, which is spring-loaded and which allows the handle to be locked in the three positions described above, i.e., in the positions of the first configuration, the second and third configurations, and in the fourth configuration. For simplicity, cam 41 is only illustrated for the second (and third) configuration, for the fourth configuration, and for an intermediate position between the two configurations. Those having ordinary skill in the art will be able to adapt the following description for cam 41 for the first configuration and for positions intermediate the first and second configurations.

Cam 41 comprises two protrusions 130 and 132. As described below, protrusion 130 acts to ensure that handle 36 can only be extended in the fourth configuration. In some embodiments the combination-seat is configured so that the only allowable change from the extended handle state of the fourth configuration is for the handle to return to its retracted state. Protrusion 130 ensures that the handle is not extendible in the first, second, or third configurations.

FIG. 10B shows protrusion 132 mating with recess 74, so that the handle, which is fixedly attached to the cam, is locked in the second configuration. In this configuration the handle is vertical. Protrusion 130, penetrates into a space 135 of a telescopic part 133 of handle 36, so that stops 134 and 136, typically formed as one part, within the telescopic part prevent part 133 from being moved within the handle. Spring stopper 58 is shown as being within the handle.

FIG. 10C shows an intermediate position, wherein cam 41 has been pushed in, so that the protrusion 132 no longer mates with recess 74. In this intermediate position, protrusion 132 is between recesses 74 and 72. As for the second configuration, protrusion 130, together with stops 134 and 136, prevents handle 36 from being extended.

FIG. 10D shows protrusion 132 mating with recess 72, so that the handle is locked in the fourth configuration. Recess 72 is deeper than recesses 76 and 74, so that cam 41 rotates further away from handle 36 compared to its position for diagrams 140 and 142. By rotating further away from the handle, protrusion 130 no longer penetrates into space 135, so that part 133 of handle 36 may be extended. The handle may thus be extended until spring stopper 58 is free of the lower part of the handle, whereupon spring stopper 58 extends from the handle as shown in FIGS. 1 and 5, locking the handle in its extended state.

Reverting to FIGS. 9A and 9B there are shown exploded views of elements of combination-seat 28, according to an embodiment of the present invention. As described above, pin 102 moves through hole 94. The pin moves between two positions. In a first position, the pin extends through hole 94 into indent 75, and the pin is held in place by butting with face 112, against which the pin may slide. In the first position, the pin locks front support 31 to surface 71. The first position of pin 102 occurs in configurations 40 and 46 (FIGS. 1A and 2A).

In a second position, pin 102 extends through hole 94 into indent 116, and the pin is held in place by butting with face 71, against which the pin may slide. In the second position, the pin locks front support 31 to rear support 37. The second position of pin 102 occurs in configurations 48, 52 and 60 (FIGS. 1B, 1C and 2C).

Pin 102 typically has faces that are sloped and that conform with sloped faces of indent 75 and indent 116, so as to facilitate easy transition between the first and second positions. The transition and operation of pin 102 is accomplished without requiring any springs to maintain the pin in its positions, or to transfer it between the positions in the following manner, pulling on handle 54 will cause pins 82 and 80 to retract from holes 115, as a result rear legs and wheels 34 will start to rotate around axle 120, while front legs and wheels are still locked to the body via pin 102 located partially inside pocket 75 and hole 94, during rotation of rear legs and wheels 34 hole 94 aligns with hole 116, at this point pin 102 slides under the influence of gravity along a slanted side surface out of pocket 75 and into hole 116 via hole 94 until pin 102 abuts surface 71, at this point front legs and wheels 32 are connected to rear legs and wheels 34, this connection causes the front legs and wheels 32 to push rear legs and wheels 34 and rotate to the operational position per configuration 48 and 52, at this point the second set of holes 117 on the rear legs and wheels are aligned with pins 80 and 82 and releasing the handle 54 will cause pins 80 and 82 to spring into holes 117 and lock the rear legs and wheels to the base. By locking the front legs and wheels to each other via pin 102 and 100, and by locking the rear legs and wheels to the base via pins 80 and 82 the assembly is locked in the operational position.

It will be appreciated that the embodiments described above are cited by way of example, and various features thereof and combinations of these features can be varied and modified. For example, the front and rear legs can be rotatable in different directions and have their storage positions on different sides of their common horizontal axis; the legs can be detachably attachable to the lower portion of the seat to bring it into a state allowing its conversion into a rollable seat, etc.

The invention claimed is:

1. A baby safety car seat having, at least when in use, a state in which the baby safety car seat is convertible into a rollable baby seat, the baby safety car seat, at least in the state, comprising:
a lower, support portion including a seat lowermost area with a seat lowermost surface configured to contact an external surface to which the seat is to be mounted, and defining a reference horizontal base plane, and two leg attachment areas at two sides of the lowermost area and above the seat lowermost surface;
an upper, seating portion having a front, head area and a rear, feet area, the head area being spaced from the reference horizontal base plane to a distance greater than the feet area;
a right and left pair of front and rear legs, the legs of each pair having distal ends associated with wheels and proximal ends articulated to the seat lowermost area at the corresponding leg attachment area, each leg being rotatable from a storage position to be taken in a safety car seat mode of the seat, in which the distal end of the leg is disposed above the reference horizontal base plane, via an intermediate position into an operational position to be taken in a rollable mode of the seat, in which the distal end of the leg is disposed below the plane; in each of the right and left pairs of front and rear legs, each of the front and rear legs is configured to rotate in the same direction as the other leg of the same pair when moving into the storage position and when moving into the operational position, and at least one of the legs in each of the right and left pairs being configured for moving at least along a part of its way between the storage and the operational positions under the influence of gravity; and
a locking mechanism configured for locking a first leg of each pair of legs to a second leg of the same pair of legs in at least one of the storage position, the intermediate position, or the operational position of the first leg, and unlocking the first and second legs from each other in at least one other position of the first leg.

2. The baby safety seat according to claim 1, wherein at least one of the rear and front legs, when in the storage position, has its distal end disposed under the head area of the upper seating portion.

3. The baby safety seat according to claim 1, wherein the leg attachment areas have a common substantially horizontal axis disposed above the seat lowermost area, the legs being rotatable about the axis at locations spaced from each other therealong.

4. The baby safety seat according to claim 3, wherein the head area of the seating portion is disposed further from the common substantially horizontal axis than the feet area thereof, and the distal ends of both of the legs of each pair of legs, when in the storage position, are disposed closer to the head area than to the feet area of the seat.

5. The baby safety seat according to claim 1, wherein the rear and front legs have different length defined by a distance between their proximal and distal ends.

6. The baby safety seat according to claim 3, wherein the distal ends of the front and rear legs of each pair, when in the storage position, are spaced to different distances from the common substantially horizontal axis.

7. The baby safety seat according to claim 1, wherein the locking mechanism is configured to perform at least one of the following functions: (a) to lock at least one of the legs to the lower portion of the seat in at least one of the storage position or operational position, allowing rotation of the leg when unlocked, between the storage and operational positions to lock the legs to each other in at least one of the storage, operational, or intermediate positions of at least one of the legs.

8. The baby safety seat according to claim 1, further comprising a handle having a handle distal end at which the seat is to be carried by a user, and handle proximal end at which the handle is attached to the lower portion of the seat so as to be rotatable about a substantially horizontal handle rotation axis, between a storage position in which the handle distal end is disposed adjacent to the head area of the upper portion of the seat and at least a carrying position, in which the handle has an orientation transverse to the substantially horizontal rotation axis and is disposed between the head and the feet areas of the upper portion of the seat.

9. The baby safety seat according to claim 8, wherein the operational position of the legs is combinable with the carrying position of the handle.

10. The baby safety seat according to claim 8, wherein the handle is rotatable from the storage or carrying position to a pushable position in which the distal end of the handle is disposed at a distance from the head area of the seat that is at least not shorter than a distance between the head and the feet areas, to bring the seat into a pushable-carriage mode.

11. The baby safety seat according to claim 10, wherein the handle is extendible in the pushable-carriage mode to increase the distance from the distal end to the base plane.

12. The baby safety seat according to claim 2, wherein both legs of each pair, when in the storage position, have their distal ends disposed under the head area of the upper seating portion.

13. The baby safety seat according to claim 7, wherein the locking mechanism is configured to perform both of the functions (a) and (b).

14. The baby safety seat according to claim 8, wherein the carrying position of the handle is substantially vertical.

15. The baby safety seat according to claim 14, wherein the operational position of the legs is combinable with the carrying position of the handle.

16. The baby safety seat according to claim 14, wherein the handle is rotatable at least from the carrying position to a pushable position in which the distal end of the handle is disposed at a distance from the head area of the seat that is at least not shorter than a distance between the head and the feet areas, to bring the seat into a pushable-carriage mode.

* * * * *